US012561790B2

(12) United States Patent
Vukkadala et al.

(10) Patent No.: US 12,561,790 B2
(45) Date of Patent: Feb. 24, 2026

(54) METHOD TO CALIBRATE, PREDICT, AND CONTROL STOCHASTIC DEFECTS IN EUV LITHOGRAPHY

(71) Applicant: KLA Corporation, Milpitas, CA (US)

(72) Inventors: Pradeep Vukkadala, Santa Clara, CA (US); Cao Zhang, Ann Arbor, MI (US); Anatoly Burov, Austin, TX (US); Guy Parsey, Ann Arbor, MI (US); Kyeongeun Ko, Gyeonggi-do (KR); Sergei G. Bakarian, Mountain View, CA (US); Janez Krek, Milan, MI (US); Kunlun Bai, Campbell, CA (US); Craig Higgins, Cedar Park, CA (US); John S. Graves, Austin, TX (US); Mark D. Smith, San Jose, CA (US); John J. Biafore, North Scituate, RI (US)

(73) Assignee: KLA Corporation, Milpitas, CA (US)

( * ) Notice: Subject to any disclaimer, the term of this patent is extended or adjusted under 35 U.S.C. 154(b) by 0 days.

(21) Appl. No.: 18/894,540

(22) Filed: Sep. 24, 2024

(65) Prior Publication Data

US 2025/0104214 A1 Mar. 27, 2025

Related U.S. Application Data

(60) Provisional application No. 63/540,605, filed on Sep. 26, 2023.

(51) Int. Cl.
*G06T 7/00* (2017.01)

(52) U.S. Cl.
CPC .......... *G06T 7/0004* (2013.01); *G06T 7/0006* (2013.01); *G06T 2207/20081* (2013.01); (Continued)

(58) Field of Classification Search
CPC ................ G06T 7/0004; G06T 7/0006; G06T 2207/20081; G06T 2207/30148; G06T 2207/30164; G06T 2207/30242
See application file for complete search history.

(56) References Cited

U.S. PATENT DOCUMENTS 10,818,001 B2 10/2020 Leung et al.
10,901,325 B2 1/2021 Gurevich et al.
(Continued)

FOREIGN PATENT DOCUMENTS

WO 2021043936 A1 3/2021

OTHER PUBLICATIONS

WIPO, International Search Report and Written Opinion issued for PCT/US2024/048253, Jan. 9, 2025.
(Continued)

*Primary Examiner* — Bobbak Safaipour
(74) *Attorney, Agent, or Firm* — Hodgson Russ LLP

(57) ABSTRACT

Using an initial probability of occurrence of a stochastic defect over an inspection area of a workpiece, one or more defects within the inspection area are imaged using an optical tool or an electron beam tool. A probability of occurrence of a stochastic defect at each of the defect locations is generated using the model. The defect locations are grouped into probability bins. A consistency between the initial probability and observed results is determined and the model can be tuned based on the consistency.

18 Claims, 4 Drawing Sheets

(52) U.S. Cl.
CPC ............... *G06T 2207/30148* (2013.01); *G06T 2207/30164* (2013.01); *G06T 2207/30242* (2013.01)

(56) References Cited

U.S. PATENT DOCUMENTS

| | | | |
|---|---|---|---|
| 11,966,156 | B2 | 4/2024 | Vukkadala et al. |
| 2019/0049858 | A1 | 2/2019 | Gurevich et al. |
| 2021/0225609 | A1 | 7/2021 | Mack |
| 2021/0396692 | A1* | 12/2021 | Fukuda ................... H01L 22/12 |
| 2022/0129775 | A1 | 4/2022 | Burov et al. |
| 2023/0036062 | A1 | 2/2023 | Matsuda et al. |
| 2023/0055365 | A1* | 2/2023 | Kim ...................... G06F 30/398 |
| 2023/0081821 | A1* | 3/2023 | Batistakis ............. G06T 7/0004 |
| | | | 382/145 |
| 2023/0326710 | A1 | 10/2023 | Eyring |
| 2023/0333033 | A1* | 10/2023 | Fukuda .............. G01N 23/2251 |
| 2023/0401692 | A1* | 12/2023 | He ........................ G06T 7/0004 |
| 2025/0005739 | A1* | 1/2025 | Jin .......................... H01J 37/28 |
| 2025/0104214 | A1* | 3/2025 | Vukkadala ............ G06T 7/0006 |
| 2025/0104215 | A1* | 3/2025 | Vukkadala ............ G06T 7/0004 |
| 2025/0104216 | A1* | 3/2025 | Vukkadala ............ G06T 7/0006 |
| 2025/0104876 | A1* | 3/2025 | Chen .................. A61K 31/4745 |

OTHER PUBLICATIONS

Latypov et al., Calibration of Gaussian random field stochastic EUV models, Proceedings of SPIE vol. 12051, Optical and EUV Nanolithography XXXV, 2022, 1205105.

Wang et al., Stochastic defect criticality prediction enabled by physical stochastic modeling and massive metrology, Proceedings of SPIE 11609, Extreme Ultraviolet (EUV) Lithography XII, 2021, 1160916.

De Bisschop, Stochastic printing failures in extreme ultraviolet lithography, Journal of Micro/Nanolithography, MEMS, and MOEMS, 2018, vol. 17, Issue 4, 041011.

De Bisschop et al., Empirical correlator for stochastic local CD uniformity in extreme ultraviolet lithography, Journal of Micro/Nanopatterning, Materials, and Metrology, 2022, vol. 21, Issue 3, 033201.

Levinson et al., Predicting very rare stochastic defects in EUVL processes for full-chip correction and verification, Proceedings of SPIE 11609, Extreme Ultraviolet (EUV) Lithography XII, 2021, 1160915, abstract.

Halder et al., Process window discovery methodology for extreme ultraviolet (EUV) lithography, Proceedings of SPIE 10959, Metrology, Inspection, and Process Control for Microlithography XXXIII, 2019, 109591V.

* cited by examiner

METHOD TO CALIBRATE, PREDICT, AND CONTROL STOCHASTIC DEFECTS IN EUV LITHOGRAPHY

CROSS-REFERENCE TO RELATED APPLICATIONS

This application claims priority to the provisional patent application filed Sep. 26, 2023, and assigned U.S. App. No. 63/540,605, the disclosure of which is hereby incorporated by reference.

FIELD OF THE DISCLOSURE

This disclosure relates to metrology of stochastic defects during semiconductor manufacturing.

BACKGROUND OF THE DISCLOSURE

Evolution of the semiconductor manufacturing industry is placing greater demands on yield management and, in particular, on metrology and inspection systems. Critical dimensions continue to shrink, yet the industry needs to decrease time for achieving high-yield, high-value production. Minimizing the total time from detecting a yield problem to fixing it maximizes the return-on-investment for a semiconductor manufacturer.

Fabricating semiconductor devices, such as logic and memory devices, typically includes processing a semiconductor wafer using a large number of fabrication processes to form various features and multiple levels of the semiconductor devices. For example, lithography is a semiconductor fabrication process that involves transferring a pattern from a reticle to a photoresist arranged on a workpiece, such as a semiconductor wafer. Additional examples of semiconductor fabrication processes include, but are not limited to, chemical-mechanical polishing (CMP), etching, deposition, and ion implantation. An arrangement of multiple semiconductor devices fabricated on a single semiconductor wafer may be separated into individual semiconductor devices.

Inspection processes are used at various steps during semiconductor manufacturing to detect defects on wafers to promote higher yield in the manufacturing process and, thus, higher profits. Inspection has always been an important part of fabricating semiconductor devices such as integrated circuits (ICs). However, as the dimensions of semiconductor devices decrease, inspection becomes even more important to the successful manufacture of acceptable semiconductor devices because smaller defects can cause the devices to fail. For instance, as the dimensions of semiconductor devices decrease, detection of defects of decreasing size has become necessary because even relatively small defects may cause unwanted aberrations in the semiconductor devices.

Defect review typically involves re-detecting defects that were detected by an inspection process and generating additional information about the defects at a higher resolution using either a high magnification optical system or a scanning electron microscope (SEM). Defect review is typically performed at discrete locations on specimens where defects have been detected by inspection. The higher resolution data for the defects generated by defect review is more suitable for determining attributes of the defects such as profile, roughness, or more accurate size information.

Photolithography can have defects driven by the quantized nature of light and materials. For example, light is quantized into photons, and the chemical reactants in photoresist are discrete molecules. These are often called shot noise defects or stochastic defects. These stochastic defects can be prevalent for extreme ultraviolet (EUV) lithography, but can appear at exposure wavelengths used in other lithographic processes such as ArF immersion. "Stochastic" means that the average behavior may be within desired specification (e.g., photoresist width, tip-to-tip measurement for line-ends, or photoresist thickness) while simultaneously exhibiting fluctuations that cause the pattern to fail (e.g., bridging or breaking for a line/space pattern) with a non-zero probability. Given that a workpiece includes billions of transistors, even small failure probabilities can lead to substantial yield loss.

Stochastic defects may present multiple challenges in a fabrication environment. Typically, defects may be assumed to be deterministic such that a known defect will consistently be present when fabricated according to a known production recipe including a pattern of elements to be fabricated on a sample and exposure parameters. For example, process window qualification (PWQ) typically identifies process-limiting defects that always occur when exposure conditions fall outside of a process window. In an instance, a process window may define limits on the defocus associated with the position of the sample along the optical axis of the lithography tool (e.g., the focal position of the sample) or the dose of energy from the illumination source incident on the sample during exposure.

EUV lithography processes used in high-end semiconductor device fabrication can result in defects on the workpiece that tend to be stochastic in nature. This can occur immediately after development of a photoresist image or further downstream such as during etch processing. Mathematical models have been used to predict the behavior of these stochastic defects to aid in manufacturing process optimization. Generalized empirical models were previously built mostly with experimental data at the foundation and sometimes with physical constraints. These generalized empirical models rely on large quantities of optical inspection and SEM-reviewed defectivity data to build and calibrate the model.

Empirical models also were built with experimental SEM data. These usually used less data to build the model by taking advantage of geometric symmetries on design features (e.g., 1D line/space features or contact hole arrays). However, these empirical models tended to be applicable only to specific design features and, hence, impractical for use in a general manner across complex design layouts.

Accelerated Rigorous models were built to emulate results of full 3D Rigorous Physics simulators. These models typically needed less experimental data to build. Often, lower-fidelity/high-precision experimental data was sufficient to build these models instead of high-resolution SEM data. Additional experimental data was typically used to calibrate/fine-tune the model to align it with observed defectivity.

Empirical models tended to be applicable to specific design features, which was impractical to use across complex design layouts. It was time consuming and expensive to collect experimental datasets needed to build and calibrate these models. The calibration of these models could require extensive curation of experimental datasets to improve prediction quality, making them difficult to implement. It also may be either intractable or impractical to build large curated datasets that enable calibration of models for predicting sufficiently low probability hotspots across sufficiently large variety of complex designs. Techniques that rely on experimental observations of defects at off-nominal operating conditions and extrapolation to nominal operating conditions may be potentially erroneous and may risk under/over prediction of defect-free process window. Improved systems and techniques are needed.

BRIEF SUMMARY OF THE DISCLOSURE

A method is provided in a first embodiment. One or more steps of the method may use a processor. The method includes receiving, at a processor, an initial probability of occurrence of a stochastic defect over an inspection area of a workpiece. The initial probability of occurrence of a stochastic defect is generated using a model. One or more defects within the inspection area are imaged using an optical tool or an electron beam tool. The defects are each at a defect location. A probability of occurrence of a stochastic defect at each of the defect locations is generated using the model. The defect locations are grouped into probability bins. A consistency between the initial probability and observed results is determined. The model is tuned based on the consistency.

The method can include determining a desired resolution of a probability prediction for each of the probability bins before the grouping using the processor.

The method can include determining an expected defect count within each of the probability bins using the processor.

The consistency can be determined using binary cross-entropy, RMSe of expected versus observed count, binomial test for significance, or a Brier score.

In an instance, the imaging uses the electron beam tool. The imaging may occur over a plurality of workpiece exposures. The method can include determining a defect frequency of the defects based on a defect count. The defect locations may be grouped by geometric pattern shapes on the workpiece.

The method can include generating the initial probability of occurrence of a stochastic defect with the model using the processor.

A non-transitory computer readable medium storing a program can be configured to instruct the processor to execute an embodiment of the method.

A system is provided in a second embodiment. The system includes an inspection tool configured to image a workpiece and a processor in electronic communication with the inspection tool. The processor is configured to receive an initial probability of occurrence of a stochastic defect over an inspection area of a workpiece, send instructions to image one or more defects within the inspection area with an inspection using the inspection tool, generate a probability of occurrence of a stochastic defect at each of the defect locations using the model, group the defect locations into probability bins, determine a consistency between the initial probability and observed results, and tune the model based on the consistency. The initial probability of occurrence of a stochastic defect is generated using a model. The defects are each at a defect location.

The inspection tool may be an optical tool or an electron beam tool.

The processor may be further configured to determine a desired resolution of a probability prediction for each of the probability bins before the grouping.

The processor may be further configured to determine an expected defect count within each of the probability bins.

The consistency may be determined using binary cross-entropy, RMSe of expected versus observed count, binomial test for significance, or a Brier score.

In an instance, inspection tool is an electron beam tool. The imaging can occur over a plurality of workpiece exposures. The processor may be further configured to determine a defect frequency of the defects based on a defect count. The defect locations can be grouped by geometric pattern shapes on the workpiece.

The processor can be further configured to generate the initial probability of occurrence of a stochastic defect with the model.

A non-transitory computer-readable storage medium can include one or more programs for executing the following steps on one or more computing devices. An initial probability of occurrence of a stochastic defect over an inspection area of a workpiece is received. The initial probability of occurrence of a stochastic defect is generated using a model. Instructions are sent to image one or more defects within the inspection area using an optical tool or an electron beam tool. The defects are each at a defect location. A probability of occurrence of a stochastic defect at each of the defect locations is generated using the model. The defect locations are grouped into probability bins. A consistency between the initial probability and observed results is determined. The model is tuned based on the consistency.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

Although claimed subject matter will be described in terms of certain embodiments, other embodiments, including embodiments that do not provide all of the benefits and features set forth herein, are also within the scope of this disclosure. Various structural, logical, process step, and electronic changes may be made without departing from the scope of the disclosure. Accordingly, the scope of the disclosure is defined only by reference to the appended claims.

Stochastic failures are often found with an inspection tool and then characterized by a top-down SEM. Inspection and characterization may happen after lithography (after develop inspection (ADI)) or after a subsequent etch and clean step (after etch inspection (AEI) or after clean inspection (ACI)). The AEI/ACI result may be the most relevant to yield and depends on the remaining photoresist thickness at ADI. Embodiments disclosed herein can calibrate stochastic defect prediction models, such as accelerated rigorous models that need fine-tuning. The calibration can use less experimental data for calibration and can avoid geometric grouping of images. Instead, embodiments can utilize grouping of hotspot locations by predicted probability of defect. The predicted probabilities across the layout can be processed in a manner optimal for downstream applications such as hotspot inspection/monitoring or hotspot repair.

Figure 1:
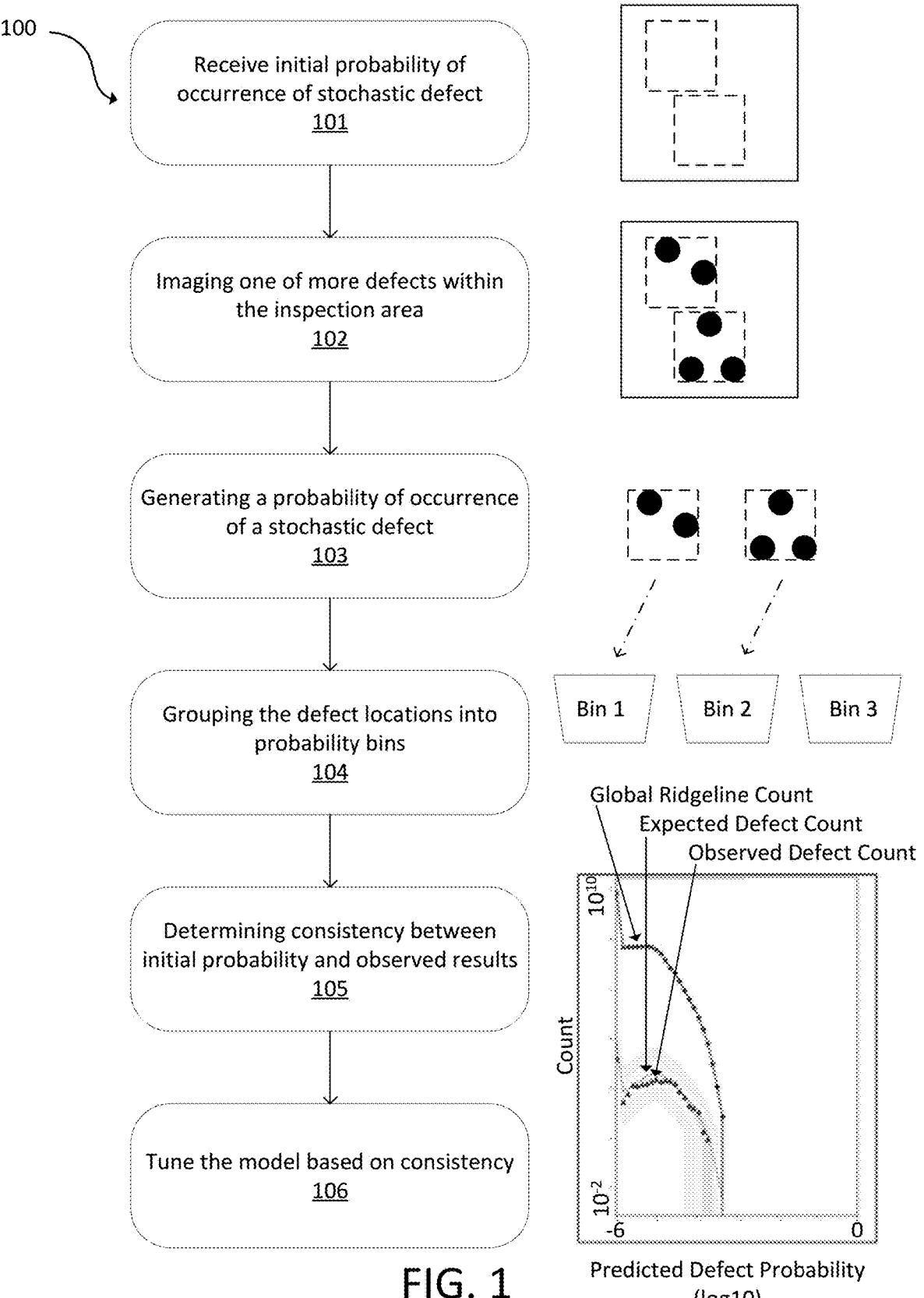
FIG. 1 illustrates an embodiment of a method in accordance with the present disclosure.

FIG. 1 shows an embodiment of a method 100. At least some of the steps of the method 100 can be performed using a processor. At 101, an initial probability of occurrence of a stochastic defect over an inspection area of a workpiece is received. This can be based on one or more images of the workpiece. The initial probability of occurrence of a stochastic defect can be generated using a model. In FIG. 1, the inspection area is represented by squares illustrated with a dashed line. The workpiece may be, for example, a semiconductor wafer or another type of workpiece. While only part of the workpiece is shown, an entire workpiece surface can be analyzed. The inspection area can include tunable parameters.

The model may include a rigorous stochastic photolithography simulation model and/or a transformed model (e.g., by applying machine learning) that can empirically reproduce the stochastic defect probability predictions of the rigorous model while gaining speed of computation at the cost of minor degradation in accuracy for certain input samples. The model may be tuned for desired tradeoff between input space coverage, speed, and accuracy. An exemplary model is described in U.S. Pub. No. 2022/0129775, which is incorporated by reference in its entirety. The tunable parameters can belong to the model. While the model contains several parameters that are learned during a training phase, these tunable parameters typically affect global characteristics of the output of the model such as the quantity of hotspots detected and overall magnitude of predicted defect probabilities.

One or more defects within the inspection area can be imaged using an optical tool or an electron beam tool at 102. Each defect is at a defect location. A processor can send instructions to perform this imaging. In FIG. 1, the defects are represented by black circles in the inspection areas. The imaging can be performed at nominal or off-nominal dose or focus conditions. While the inspection areas are shown having the same size, the inspection areas can have different sizes. One inspection area can be a sub-region of another area analyzed by the model.

At 103, a probability of occurrence of a stochastic defect at each of the defect locations is determined using the model. The desired pattern on the photomask may be an input for the model. Besides the mask patterns, inputs for the model can include process parameters such as exposure dose, focus, source shape, photo-resist thickness, etch-resistance, etc.

The defect locations are then grouped into probability bins at 104. The bins can have a desired bin-width, which is a desired resolution of probability prediction. This bin-width can be uniformly-spaced or nonuniformly-spaced across a range of probabilities. An exemplary bin-width may be, for example, 0.027 decade. A large bin-width such as 0.33 decades (log 10 probability value) may be used in an embodiment if lower resolution in probability prediction is needed.

Optionally, a desired resolution of a probability prediction for each of the probability bins can be determined before the grouping at 104.

An expected defect count within each of the probability bins can be determined. The expected defect count in each can be a count multiplied by the probability.

A consistency between the initial probability and observed results for a workpiece or batch of workpieces using the method 100 is determined at 105. FIG. 1 shows an exemplary chart showing a global ridgeline count, expected defect count (dashed line), and observed defect count (triangles) with various tolerances. The model can be tuned based on this consistency at 106. At 106, one or more model parameters can be adjusted, such as to improve accuracy. Each adjustment of model parameter may be followed by checking the updated model prediction. An optimization algorithm can be used to find the best parameters that maximize the consistency. The consistency can be determined using a statistical testing metric such as binary cross-entropy, RMSe of expected versus observed count, binomial test for significance, or a Brier score. Binary cross-entropy can be considered as a measure of the difference between two probability distributions. RMSe of expected versus observed count is the root-mean-square of the error. For RMSe, this error is defined as the difference between the expected count and the observed count.

Figure 4:
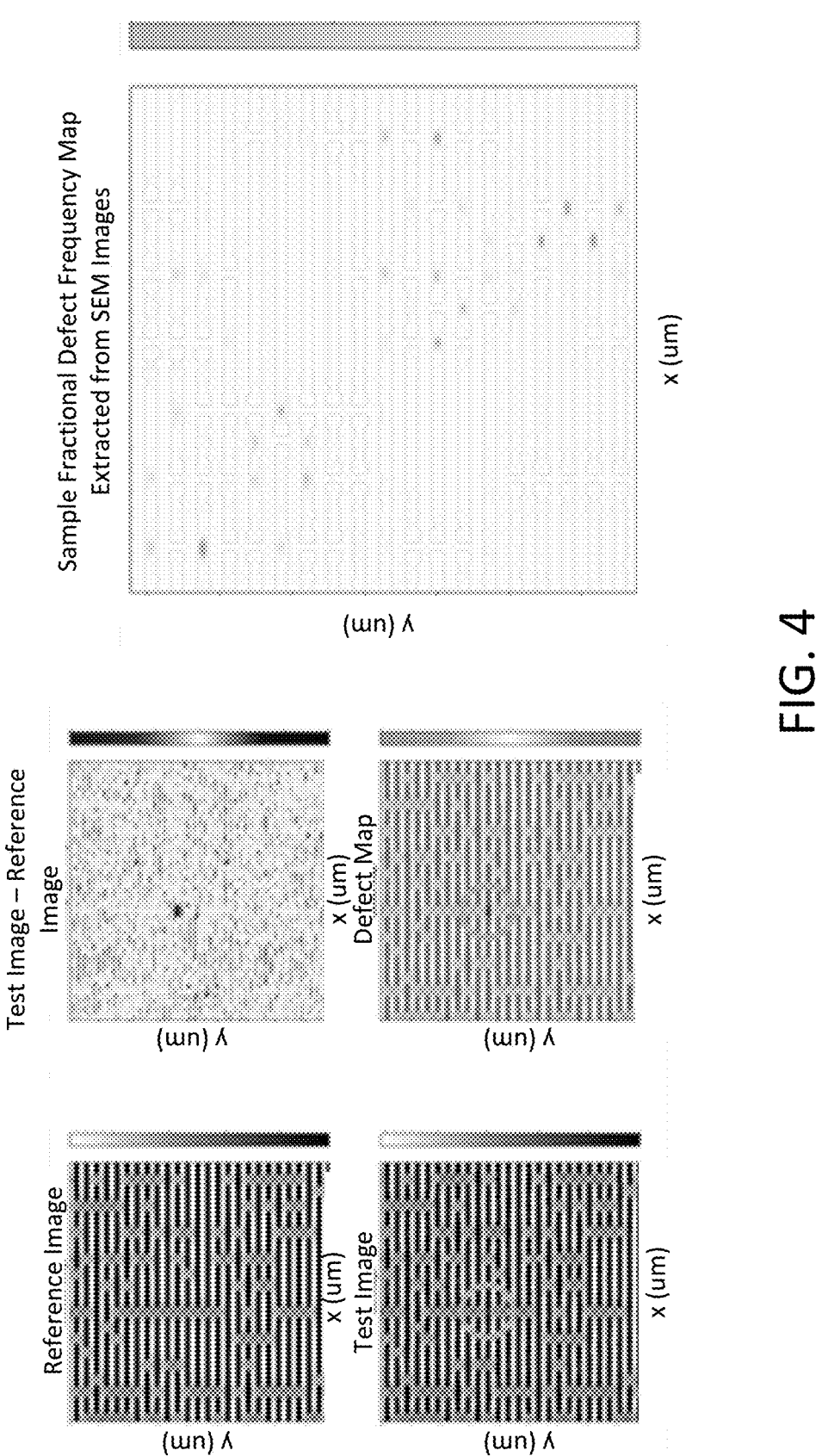
FIG. 4 is an exemplary sample fraction defect frequency map extracted from electron beam tool images.

In an embodiment, the imaging uses an electron beam tool. The imaging can occur over multiple workpiece exposures, such as that shown in FIG. 4. There may be multiple trials of workpiece exposures. Defects can be detected from these electron beam tool images, such as using automatic image alignment, determination of a reference image, defect detection (such as using image subtraction with the reference image), and noise filtering. The defect locations are grouped by geometric pattern shapes on the workpiece. Repeated trials can be performed by grouping multiple locations with a similar geometric pattern shape as the selected location. This may include automatic pattern recognition to detect and align similar patterns at different locations on the workpiece. A defect frequency of the defects can be determined based on a defect count.

In another embodiment of calibration and verification, predictions from a model (e.g., probability of occurrence of stochastic defects) are taken over an inspection area with tunable parameters. Defects are then collected within the inspection area, such as using an optical system or an electron beam system (e.g., an SEM). This can occur at a particular dose and focus condition (e.g., nominal dose and nominal focus conditions used during manufacturing). The inspection area may be the same the inspection area that was modeled or a sub-region of the inspection area that was modeled.

A number of observed defects within the inspection area or sub-region at the particular dose/focus condition can be counted. The model then provides a predicted defect count within the inspection area or sub-region at the particular dose-focus condition. Collecting defects, counting defects, and providing a predicted defect count can be repeated at various dose/focus conditions, such as off-nominal conditions where hotspots may be more frequently triggered. Consistency between the model and the observations can be estimated using the counts from observations and predictions using one or more statistical testing metrics. These metrics can include, for example, a Pearson correlation coefficient, slope and intercept of least-squares fit, binary cross-entropy, RMSe of expected versus observed defect-count, binomial test for significance, or Brier score. The model can then be tuned to obtain an improved or best score.

In another embodiment of calibration and verification, predictions from a model (e.g., probability of occurrence of stochastic defects) are taken over an inspection area with tunable parameters. Defects are then collected within the inspection area, such as using an optical system or an electron beam system (e.g., an SEM). This can occur at a particular dose and focus condition (e.g., nominal dose and focus conditions used during manufacturing and/or off-nominal dose and focus conditions). The inspection area may be the same the inspection area that was modeled or a sub-region of the inspection area that was modeled.

Defect locations and a pattern shape associated with each defect location can then be determined. For each of these pattern shapes, a number of matching instances within the inspected area of the layout (which may be a sub-region) is determined. Subsequently, the observed frequency or probability of a defect is determined as the ratio of the number of defects to the number of matching instances for each pattern shape. An average predicted probability of the defect from the model also can be determined for each pattern shape. Optionally, all other pattern shapes present within the inspected area of the layout where no defects were observed may be assigned zero observed frequency, while also extracting and assigning the predicted probability of defect from the model. Consistency between the model and the observations can be estimated using the counts from observations and predictions using one or more statistical testing metrics. These metrics can include, for example, binary cross-entropy, RMSe of expected versus observed defect frequency for all pattern shapes, binomial test for significance, or Brier score. The model can then be tuned to obtain an improved or best score.

The method 100 can use either an optical tool or electron beam tool (e.g., a BBP tool followed by SEM review). However, certain embodiments of the method 100 can use an electron beam tool. For example, the steps described around FIG. 4 can operate using an electron beam tool.

Figure 2:
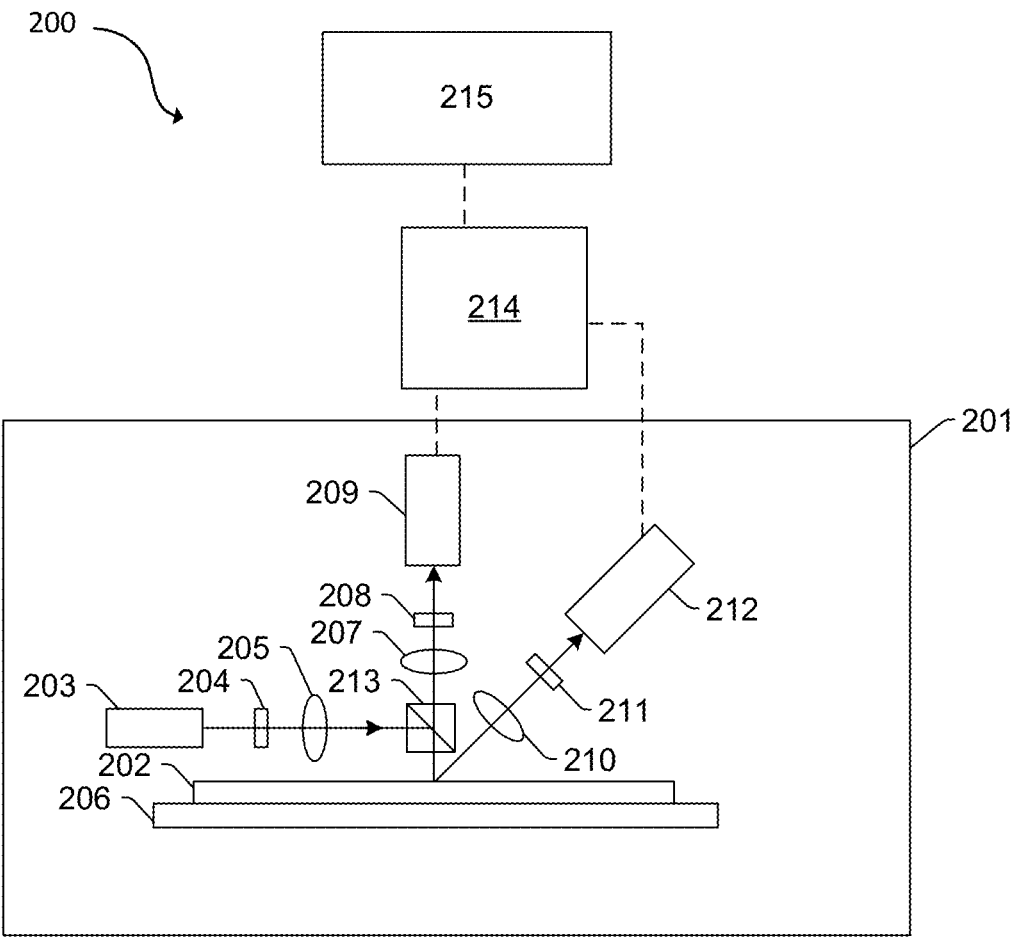
FIG. 2 is a diagram of an exemplary optical tool.

One embodiment of a system 200 is shown in FIG. 2. The system 200 includes optical based subsystem 201. In general, the optical based subsystem 201 is configured for generating optical based output for a workpiece 202 by directing light to (or scanning light over) and detecting light from the workpiece 202. In one embodiment, the workpiece 202 includes a wafer. The wafer may include any wafer known in the art. In another embodiment, the workpiece 202 includes a reticle. The reticle may include any reticle known in the art.

In the embodiment of the system 200 shown in FIG. 2, optical based subsystem 201 includes an illumination subsystem configured to direct light to workpiece 202. The illumination subsystem includes at least one light source. For example, as shown in FIG. 2, the illumination subsystem includes light source 203. In one embodiment, the illumination subsystem is configured to direct the light to the workpiece 202 at one or more angles of incidence, which may include one or more oblique angles and/or one or more normal angles. For example, as shown in FIG. 2, light from light source 203 is directed through optical element 204 and then lens 205 to workpiece 202 at an oblique angle of incidence. The oblique angle of incidence may include any suitable oblique angle of incidence, which may vary depending on, for instance, characteristics of the workpiece 202.

The optical based subsystem 201 may be configured to direct the light to the workpiece 202 at different angles of incidence at different times. For example, the optical based subsystem 201 may be configured to alter one or more characteristics of one or more elements of the illumination subsystem such that the light can be directed to the workpiece 202 at an angle of incidence that is different than that shown in FIG. 2. In one such example, the optical based subsystem 201 may be configured to move light source 203, optical element 204, and lens 205 such that the light is directed to the workpiece 202 at a different oblique angle of incidence or a normal (or near normal) angle of incidence.

In some instances, the optical based subsystem 201 may be configured to direct light to the workpiece 202 at more than one angle of incidence at the same time. For example, the illumination subsystem may include more than one illumination channel, one of the illumination channels may include light source 203, optical element 204, and lens 205 as shown in FIG. 2 and another of the illumination channels (not shown) may include similar elements, which may be configured differently or the same, or may include at least a light source and possibly one or more other components such as those described further herein. If such light is directed to the specimen at the same time as the other light, one or more characteristics (e.g., wavelength, polarization, etc.) of the light directed to the workpiece 202 at different angles of incidence may be different such that light resulting from illumination of the workpiece 202 at the different angles of incidence can be discriminated from each other at the detector(s).

In another instance, the illumination subsystem may include only one light source (e.g., light source 203 shown in FIG. 2) and light from the light source may be separated into different optical paths (e.g., based on wavelength, polarization, etc.) by one or more optical elements (not shown) of the illumination subsystem. Light in each of the different optical paths may then be directed to the workpiece 202. Multiple illumination channels may be configured to direct light to the workpiece 202 at the same time or at different times (e.g., when different illumination channels are used to sequentially illuminate the specimen). In another instance, the same illumination channel may be configured to direct light to the workpiece 202 with different characteristics at different times. For example, in some instances, optical element 204 may be configured as a spectral filter and the properties of the spectral filter can be changed in a variety of different ways (e.g., by swapping out the spectral filter) such that different wavelengths of light can be directed to the workpiece 202 at different times. The illumination subsystem may have any other suitable configuration known in the art for directing the light having different or the same characteristics to the workpiece 202 at different or the same angles of incidence sequentially or simultaneously.

In one embodiment, light source 203 may include a broadband plasma (BBP) source. In this manner, the light generated by the light source 203 and directed to the workpiece 202 may include broadband light. However, the light source may include any other suitable light source such as a laser. The laser may include any suitable laser known in the art and may be configured to generate light at any suitable wavelength or wavelengths known in the art. In addition, the laser may be configured to generate light that is monochromatic or nearly-monochromatic. In this manner, the laser may be a narrowband laser. The light source 203 may also include a polychromatic light source that generates light at multiple discrete wavelengths or wavebands.

Light from optical element 204 may be focused onto workpiece 202 by lens 205. Although lens 205 is shown in FIG. 2 as a single refractive optical element, it is to be understood that, in practice, lens 205 may include a number of refractive and/or reflective optical elements that in combination focus the light from the optical element to the specimen. The illumination subsystem shown in FIG. 2 and described herein may include any other suitable optical elements (not shown). Examples of such optical elements include, but are not limited to, polarizing component(s), spectral filter(s), spatial filter(s), reflective optical element(s), apodizer(s), beam splitter(s) (such as beam splitter 213), aperture(s), and the like, which may include any such suitable optical elements known in the art. In addition, the optical based subsystem 201 may be configured to alter one or more of the elements of the illumination subsystem based on the type of illumination to be used for generating the optical based output.

The optical based subsystem 201 may also include a scanning subsystem configured to cause the light to be scanned over the workpiece 202. For example, the optical based subsystem 201 may include stage 206 on which workpiece 202 is disposed during optical based output generation. The scanning subsystem may include any suitable mechanical and/or robotic assembly (that includes stage 206) that can be configured to move the workpiece 202 such that the light can be scanned over the workpiece 202. In addition, or alternatively, the optical based subsystem 201 may be configured such that one or more optical elements of the optical based subsystem 201 perform scanning of the light over the workpiece 202. The light may be scanned over the workpiece 202 in any suitable fashion such as in a serpentine-like path or in a spiral path.

The optical based subsystem 201 further includes one or more detection channels. At least one of the one or more detection channels includes a detector configured to detect light from the workpiece 202 due to illumination of the workpiece 202 by the subsystem and to generate output responsive to the detected light. For example, the optical based subsystem 201 shown in FIG. 2 includes two detection channels, one formed by collector 207, element 208, and detector 209 and another formed by collector 210, element 211, and detector 212. As shown in FIG. 2, the two detection channels are configured to collect and detect light at different angles of collection. In some instances, both detection channels are configured to detect scattered light, and the detection channels are configured to detect light that is scattered at different angles from the workpiece 202. However, one or more of the detection channels may be configured to detect another type of light from the workpiece 202 (e.g., reflected light).

As further shown in FIG. 2, both detection channels are shown positioned in the plane of the paper and the illumination subsystem is also shown positioned in the plane of the paper. Therefore, in this embodiment, both detection channels are positioned in (e.g., centered in) the plane of incidence. However, one or more of the detection channels may be positioned out of the plane of incidence. For example, the detection channel formed by collector 210, element 211, and detector 212 may be configured to collect and detect light that is scattered out of the plane of incidence. Therefore, such a detection channel may be commonly referred to as a "side" channel, and such a side channel may be centered in a plane that is substantially perpendicular to the plane of incidence.

Although FIG. 2 shows an embodiment of the optical based subsystem 201 that includes two detection channels, the optical based subsystem 201 may include a different number of detection channels (e.g., only one detection channel or two or more detection channels). In one such instance, the detection channel formed by collector 210, element 211, and detector 212 may form one side channel as described above, and the optical based subsystem 201 may include an additional detection channel (not shown) formed as another side channel that is positioned on the opposite side of the plane of incidence. Therefore, the optical based subsystem 201 may include the detection channel that includes collector 207, element 208, and detector 209 and that is centered in the plane of incidence and configured to collect and detect light at scattering angle(s) that are at or close to normal to the workpiece 202 surface. This detection channel may therefore be commonly referred to as a "top" channel, and the optical based subsystem 201 may also include two or more side channels configured as described above. As such, the optical based subsystem 201 may include at least three channels (i.e., one top channel and two side channels), and each of the at least three channels has its own collector, each of which is configured to collect light at different scattering angles than each of the other collectors.

As described further above, each of the detection channels included in the optical based subsystem 201 may be configured to detect scattered light. Therefore, the optical based subsystem 201 shown in FIG. 2 may be configured for dark field (DF) output generation for specimens 202. However, the optical based subsystem 201 may also or alternatively include detection channel(s) that are configured for bright field (BF) output generation for specimens 202. In other words, the optical based subsystem 201 may include at least one detection channel that is configured to detect light specularly reflected from the workpiece 202. Therefore, the optical based subsystems 201 described herein may be configured for only DF, only BF, or both DF and BF imaging. Although each of the collectors are shown in FIG. 2 as single refractive optical elements, it is to be understood that each of the collectors may include one or more refractive optical die(s) and/or one or more reflective optical element(s).

The one or more detection channels may include any suitable detectors known in the art. For example, the detectors may include photo-multiplier tubes (PMTs), charge coupled devices (CCDs), time delay integration (TDI) cameras, and any other suitable detectors known in the art. The detectors may also include non-imaging detectors or imaging detectors. In this manner, if the detectors are non-imaging detectors, each of the detectors may be configured to detect certain characteristics of the scattered light such as intensity but may not be configured to detect such characteristics as a function of position within the imaging plane. As such, the output that is generated by each of the detectors included in each of the detection channels of the optical based subsystem may be signals or data, but not image signals or image data. In such instances, a processor such as processor 214 may be configured to generate images of the workpiece 202 from the non-imaging output of the detectors. However, in other instances, the detectors may be configured as imaging detectors that are configured to generate imaging signals or image data. Therefore, the optical based subsystem may be configured to generate optical images or other optical based output described herein in a number of ways.

It is noted that FIG. 2 is provided herein to generally illustrate a configuration of an optical based subsystem 201 that may be included in the system embodiments described herein or that may generate optical based output that is used by the system embodiments described herein. The optical based subsystem 201 configuration described herein may be altered to optimize the performance of the optical based subsystem 201 as is normally performed when designing a commercial output acquisition system. In addition, the systems described herein may be implemented using an existing system (e.g., by adding functionality described herein to an existing system). For some such systems, the methods described herein may be provided as optional functionality of the system (e.g., in addition to other functionality of the system). Alternatively, the system described herein may be designed as a completely new system.

Figure 3:
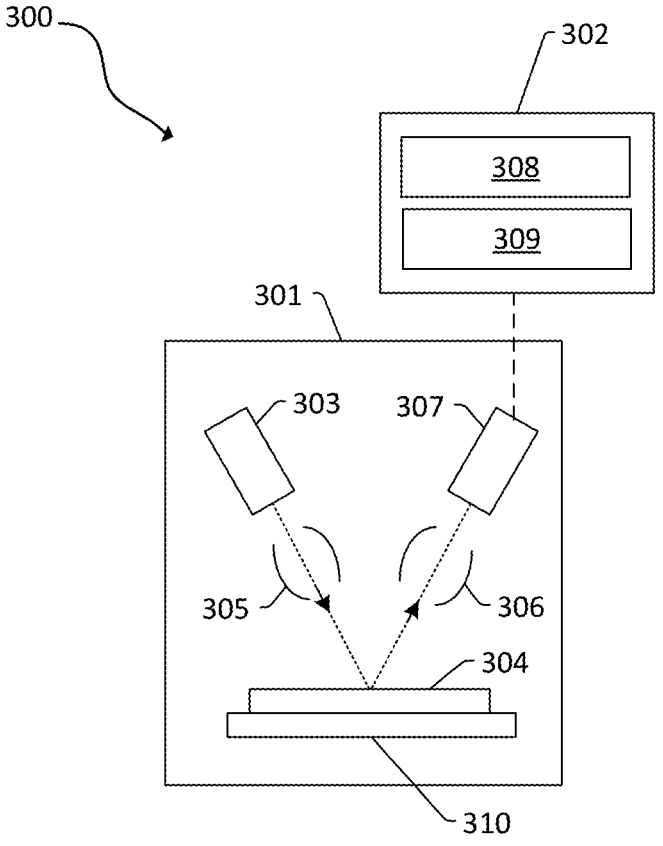
FIG. 3 is a diagram of an exemplary electron beam tool.

FIG. 3 is a block diagram of an embodiment of a system 300. The system 300 includes a wafer inspection tool (which includes the electron column 301) configured to generate images of a workpiece 304.

The wafer inspection tool includes an output acquisition subsystem that includes at least an energy source and a detector. The output acquisition subsystem may be an electron beam-based output acquisition subsystem. For example, in one embodiment, the energy directed to the workpiece 304 includes electrons, and the energy detected from the workpiece 304 includes electrons. In this manner, the energy source may be an electron beam source. In one such embodiment shown in FIG. 3, the output acquisition subsystem includes electron column 301, which is coupled to computer subsystem 302. A stage 310 may hold the workpiece 304.

As also shown in FIG. 3, the electron column 301 includes an electron beam source 303 configured to generate electrons that are focused to workpiece 304 by one or more elements 305. The electron beam source 303 may include, for example, a cathode source or emitter tip. The one or more elements 305 may include, for example, a gun lens, an anode, a beam limiting aperture, a gate valve, a beam current selection aperture, an objective lens, and a scanning subsystem, all of which may include any such suitable elements known in the art.

Electrons returned from the workpiece 304 (e.g., secondary electrons) may be focused by one or more elements 306 to detector 307. One or more elements 306 may include, for example, a scanning subsystem, which may be the same scanning subsystem included in element(s) 305.

The electron column 301 also may include any other suitable elements known in the art.

Although the electron column 301 is shown in FIG. 3 as being configured such that the electrons are directed to the workpiece 304 at an oblique angle of incidence and are scattered from the workpiece 304 at another oblique angle, the electron beam may be directed to and scattered from the workpiece 304 at any suitable angles. In addition, the electron beam-based output acquisition subsystem may be configured to use multiple modes to generate images of the workpiece 304 (e.g., with different illumination angles, collection angles, etc.). The multiple modes of the electron beam-based output acquisition subsystem may be different in any image generation parameters of the output acquisition subsystem.

It is noted that FIG. 3 is provided herein to generally illustrate a configuration of an electron beam-based output acquisition subsystem that may be used in the embodiments described herein. The electron beam-based output acquisition subsystem configuration described herein may be altered to optimize the performance of the output acquisition subsystem as is normally performed when designing a commercial output acquisition system. In addition, the systems described herein may be implemented using an existing system (e.g., by adding functionality described herein to an existing system). For some such systems, the methods described herein may be provided as optional functionality of the system (e.g., in addition to other functionality of the system). Alternatively, the system described herein may be designed as a completely new system.

Although the output acquisition subsystem is described above as being an electron beam-based output acquisition subsystem, the output acquisition subsystem may be an ion beam-based output acquisition subsystem. Such an output acquisition subsystem may be configured as shown in FIG. 3 except that the electron beam source may be replaced with any suitable ion beam source known in the art. In addition, the output acquisition subsystem may be any other suitable ion beam-based output acquisition subsystem such as those included in commercially available focused ion beam (FIB) systems, helium ion microscopy (HIM) systems, and secondary ion mass spectroscopy (SIMS) systems.

Embodiments of the system 200 and system 300 include a processor and electronic data storage unit, such as the processor 214 or processor 308 and the electronic data storage unit 215 or electronic data storage unit 309. The processor 214 or processor 308 may include a microprocessor, a microcontroller, or other devices. In an instance, the processor 309 is part of a computer subsystem, such as computer subsystem 302.

The processor 214 or processor 308, other system(s), or other subsystem(s) described herein may be part of various systems, including a personal computer system, image computer, mainframe computer system, workstation, network appliance, internet appliance, or other device. The subsystem(s) or system(s) may also include any suitable processor known in the art, such as a parallel processor. In addition, the subsystem(s) or system(s) may include a platform with high-speed processing and software, either as a standalone or a networked tool.

The processor 214 or processor 308 may be coupled to the components of the system 200 or system 300 in any suitable manner (e.g., via one or more transmission media, which may include wired and/or wireless transmission media) such that the processor 214 or processor 308 can receive output. The processor 214 or processor 308 may be configured to perform a number of functions using the output. The wafer inspection tool can receive instructions or other information from the processor 214 or processor 308. The processor 214 or processor 308 optionally may be in electronic communication with another wafer inspection tool, a wafer metrology tool, or a wafer review tool (not illustrated) to receive additional information or send instructions.

The processor 214 or processor 308 is in electronic communication with the wafer inspection tool, such as the detector 209, detector 212, or detector 307. The processor 214 or processor 308 may be configured to process images generated using measurements from a detector or perform other functions. For example, the processor may perform embodiments of the method 100 or method 200.

The processor 214 or processor 308 and its associated electronic data storage unit may be disposed in or otherwise part of the system 200 or system 300 or may be part of another device. In an example, the processor 214 or processor 308 and its associated electronic data storage unit may be part of a standalone control unit or in a centralized quality control unit. Multiple processors 214 or processors 308 or electronic data storage units may be used.

The processor 214 or processor 308 may be implemented in practice by any combination of hardware, software, and firmware. Also, its functions as described herein may be performed by one unit, or divided up among different components, each of which may be implemented in turn by any combination of hardware, software and firmware. Program code or instructions for the processor 214 or processor 308 to implement various methods and functions may be stored in readable storage media, such as a memory in the electronic data storage unit 215, electronic data storage unit 309, or other memory.

The processor 214 or processor 308 may be configured to perform a number of functions using the output of the system 200, system 300, or other output. For instance, the processor 214 or processor 308 may be configured to send the output to its respective electronic data storage unit or another storage medium. The processor 214 or processor 308 may be further configured as described herein.

The processor 214 or processor 308 may be configured according to any of the embodiments described herein. For example, the processor 214 or processor 308 can be configured to perform an embodiment of the method 100. The processor 214 or processor 308 also may be configured to perform other functions or additional steps using the output of the system 200, system 300, or using images or data from other sources.

If the system 200 or system 300 includes more than one processor 214 or processor 308, then the different subsystems may be coupled to each other such that images, data, information, instructions, etc. can be sent between the subsystems. For example, one subsystem may be coupled to additional subsystem(s) by any suitable transmission media, which may include any suitable wired and/or wireless transmission media known in the art. Two or more of such subsystems may also be effectively coupled by a shared computer-readable storage medium (not shown).

The processor used to perform the embodiments disclosed herein, such as the processor 214 or the processor 308, may be part of a single computer or a network of computers. The processor may include one or more CPU processors or may include a combination of CPU and GPU processors. In an example, there are 15 computer nodes in a network and each node includes forty-four CPUs and two GPUs with 385 GB of RAM and 500 GB of hard-disk space.

Various steps, functions, and/or operations of system 200, system 300, or the methods disclosed herein are carried out by one or more of the following: electronic circuits, logic gates, multiplexers, programmable logic devices, ASICs, analog or digital controls/switches, microcontrollers, or computing systems. Program instructions implementing methods such as those described herein may be transmitted over or stored on carrier medium. The carrier medium may include a storage medium such as a read-only memory, a random access memory, a magnetic or optical disk, a non-volatile memory, a solid state memory, a magnetic tape, and the like. A carrier medium may include a transmission medium such as a wire, cable, or wireless transmission link. Therefore, the above description should not be interpreted as a limitation on the present disclosure but merely an illustration.

An additional embodiment relates to a non-transitory computer-readable medium storing program instructions executable on a controller for performing a computer-implemented method, as disclosed herein. In particular, an electronic data storage unit 215, electronic data storage unit 309, or other storage medium may contain non-transitory computer-readable medium that includes program instructions executable on a processor. The computer-implemented method may include any step(s) of any method(s) described herein, including an embodiment of the method 100.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes (MFC), Streaming SIMD Extension (SSE), or other technologies or methodologies, as desired.

Each of the steps of the method may be performed as described herein. The methods also may include any other step(s) that can be performed by the processor and/or computer subsystem(s) or system(s) described herein. The steps can be performed by one or more computer systems, which may be configured according to any of the embodiments described herein. In addition, the methods described above may be performed by any of the system embodiments described herein.

Although the present disclosure has been described with respect to one or more particular embodiments, it will be understood that other embodiments of the present disclosure may be made without departing from the scope of the present disclosure. Hence, the present disclosure is deemed limited only by the appended claims and the reasonable interpretation thereof.

What is claimed is:

1. A method comprising:
   receiving, at a processor, an initial probability of occurrence of a stochastic defect over an inspection area of a workpiece, wherein the initial probability of occurrence of a stochastic defect is generated using a model;
   imaging one or more defects within the inspection area using an optical tool or an electron beam tool, wherein the defects are each at a defect location;
   generating, using the processor, a probability of occurrence of a stochastic defect at each of the defect locations using the model;
   determining a desired resolution of a probability prediction for each of the probability bins using the processor;
   grouping, using the processor, the defect locations into probability bins after determining the desired resolution;
   determining, using the processor, a consistency between the initial probability and observed results; and
   tuning the model based on the consistency.

2. The method of claim 1, further comprising determining an expected defect count within each of the probability bins using the processor.

3. The method of claim 1, wherein the consistency is determined using binary cross-entropy, RMSe of expected versus observed count, binomial test for significance, or a Brier score.

4. The method of claim 1, wherein the imaging uses the electron beam tool.

5. The method of claim 4, wherein the imaging occurs over a plurality of workpiece exposures.

6. The method of claim 5, further comprising determining a defect frequency of the defects based on a defect count.

7. The method of claim 4, wherein the defect locations are grouped by geometric pattern shapes on the workpiece.

8. The method of claim 1, further comprising generating the initial probability of occurrence of a stochastic defect with the model using the processor.

9. A non-transitory computer readable medium storing a program configured to instruct the processor to execute the method of claim 1.

10. A system comprising:
    an inspection tool configured to image a workpiece; and
    a processor in electronic communication with the inspection tool, wherein the processor is configured to:
    receive an initial probability of occurrence of a stochastic defect over an inspection area of a workpiece, wherein the initial probability of occurrence of a stochastic defect is generated using a model;
    send instructions to image one or more defects within the inspection area with an inspection using the inspection tool, wherein the defects are each at a defect location;
    generate a probability of occurrence of a stochastic defect at each of the defect locations using the model;
    determine a desired resolution of a probability prediction for each of the probability bins;
    group the defect locations into probability bins after the desired resolution is determined;
    determine a consistency between the initial probability and observed results; and
    tune the model based on the consistency.

11. The system of claim 10, wherein the inspection tool is an optical tool or an electron beam tool.

12. The system of claim 10, wherein the processor is further configured to determine an expected defect count within each of the probability bins.

13. The system of claim 10, wherein the consistency is determined using binary cross-entropy, RMSe of expected versus observed count, binomial test for significance, or a Brier score.

14. The system of claim 10, wherein the inspection tool is an electron beam tool, and wherein the imaging occurs over a plurality of workpiece exposures.

15. The system of claim 14, wherein the processor is further configured to determine a defect frequency of the defects based on a defect count.

16. The system of claim 14, wherein the defect locations are grouped by geometric pattern shapes on the workpiece.

17. The system of claim 10, wherein the processor is further configured to generate the initial probability of occurrence of a stochastic defect with the model.

18. A non-transitory computer-readable storage medium, comprising one or more programs for executing the following steps on one or more computing devices:

receive an initial probability of occurrence of a stochastic defect over an inspection area of a workpiece, wherein the initial probability of occurrence of a stochastic defect is generated using a model; and send instructions to image one or more defects within the inspection area with an inspection using an optical tool or an electron beam tool, wherein the defects are each at a defect location;

generate a probability of occurrence of a stochastic defect at each of the defect locations using the model;

determine a desired resolution of a probability prediction for each of the probability bins;

group the defect locations into probability bins after the desired resolution is determined;

determine a consistency between the initial probability and observed results; and tune the model based on the consistency.

\* \* \* \* \*